(12) United States Patent
Fan et al.

(10) Patent No.: US 11,766,954 B2
(45) Date of Patent: Sep. 26, 2023

(54) CONTROL METHOD AND SYSTEM OF NEUTRAL SECTION PASSING OF MULTI-LOCOMOTIVE SHORT BROKE TRAINS

(71) Applicant: CRRC ZHUZHOU LOCOMOTIVE CO., LTD., Hunan (CN)

(72) Inventors: Yunxin Fan, Hunan (CN); Ande Zhou, Hunan (CN); Aijun Chen, Hunan (CN); Lili Ma, Hunan (CN); Jianlin Chen, Hunan (CN); Xining Li, Hunan (CN)

(73) Assignee: CRRC Zhuzhou Locomotive Co., Ltd.

( * ) Notice: Subject to any disclaimer, the term of this patent is extended or adjusted under 35 U.S.C. 154(b) by 850 days.

(21) Appl. No.: 16/652,010

(22) PCT Filed: Dec. 25, 2017

(86) PCT No.: PCT/CN2017/118288
§ 371 (c)(1),
(2) Date: Mar. 27, 2020

(87) PCT Pub. No.: WO2019/061894
PCT Pub. Date: Apr. 4, 2019

(65) Prior Publication Data
US 2020/0262314 A1 Aug. 20, 2020

(30) Foreign Application Priority Data
Sep. 29, 2017 (CN) .......................... 201710909923.2

(51) Int. Cl.
*B60M 3/04* (2006.01)
*B60L 9/00* (2019.01)
(Continued)

(52) U.S. Cl.
CPC ................. *B60M 3/04* (2013.01); *B60L 9/00* (2013.01); *B60M 1/00* (2013.01); *B60M 3/00* (2013.01)

(58) Field of Classification Search
CPC .. B60M 1/00; B60M 3/00; B60M 3/04; B60L 9/00
See application file for complete search history.

(56) References Cited

FOREIGN PATENT DOCUMENTS

| CN | 101559732 A | 10/2009 |
|---|---|---|
| CN | 10746285 A | 6/2010 |

(Continued)

OTHER PUBLICATIONS

International Search Report; PCT/CN2017/118288; dated Jun. 29, 2018.

*Primary Examiner* — Robert J McCarry, Jr.
(74) *Attorney, Agent, or Firm* — Knobbe Martens Olson and Bear, LLP

(57) ABSTRACT

A control method and system of neutral section passing of multi-locomotive short broke trains. Distance traveled by a train after a primary multiple unit enters a neutral section is calculated in real time, so that a neutral section passing procedure of a secondary multiple unit is effectively controlled, thereby solving the problem that when the multi-locomotive short broke trains operate with double-raised pantographs, if the distance between the two pantographs is shorter than the length of a neutral zone of a neutral section and longer than the length of a no-electricity zone of the neutral section, when the two pantographs pass through the neutral sections, the two pantographs will span the two neutral sections and generate an interphase short circuit. The method improves safety of the EMU when it passing neutral section and ensure that the EMU can reliably pass through the neutral section with double-raised pantographs. The
(Continued)

present invention has the advantages of being safe, reliable, easy to implement and convenient to promote and apply.

9 Claims, 2 Drawing Sheets

(51) Int. Cl.
  *B60M 3/00* (2006.01)
  *B60M 1/00* (2006.01)

(56) References Cited

FOREIGN PATENT DOCUMENTS

| | | | |
|---|---|---|---|
| CN | 201998825 U | * | 10/2011 |
| CN | 201998825 U | | 10/2011 |
| CN | 106627257 A | | 5/2017 |
| JP | 2003200765 A | | 7/2003 |
| KR | 20150127945 A | | 11/2015 |

* cited by examiner

CONTROL METHOD AND SYSTEM OF NEUTRAL SECTION PASSING OF MULTI-LOCOMOTIVE SHORT BROKE TRAINS

The present patent application is a National Phase of International Application No. PCT/CN2017/118288, filed on Dec. 25, 2017 and entitled "SHORT-FORM ELECTRIC MULTIPLE UNIT DOUBLE HEADING PHASE SEPARATION PASSAGE CONTROL METHOD AND SYSTEM," which claims priority to Chinese Patent Application No. 201710909923.2, filed on Sep. 29, 2017 and entitled "SHORT-FORM ELECTRIC MULTIPLE UNIT DOUBLE HEADING PHASE SEPARATION PASSAGE CONTROL METHOD AND SYSTEM."

FIELD OF THE INVENTION

The present invention relates to the field of control method neutral section passing of railway vehicles, and in particular to a control method and system of neutral section passing of multi-locomotive short broke trains.

BACKGROUND OF THE INVENTION

At an electrified traction section, a traction contact network uses a single-phase power frequency AC power supply manner. In order to balance the three-phase load of the power system and improve the utilization rate of the power grid, it is required that an electrified railway contact network adopts a segmented phase commutation power supply manner. In order to prevent an interphase short circuit, the adjacent phases are separated by air or an insulator, which is called "neutral section insulation". There is a power supply dead zone every 20 km-25 km on the domestic contact network, which is called "neutral section". The typical neutral section of the contact network is six-spanning anchoring section joint neutral section with a "non-electricity zone" of which is about 22 m long and a "neutral zone" of which is about 190 m long.

Pantograph enters and exits the neutral section in the absence of current under automatic neutral section passing control or manual neutral section passing control in existing EMUs, thereby ensuring the service lives of the pantograph and the contact network. However, it is not considered in the prior art that, when the multi-locomotive short broke trains operate with double-raised pantographs, if the distance between the two pantographs is shorter than the length of a neutral zone of the neutral section and longer than the length of a no-electricity zone of the neutral section, when the two pantographs pass through the neutral sections, the two pantographs will span two neutral sections and generate an interphase short circuit.

SUMMARY OF THE INVENTION

The technical problem to be solved by the present invention is to provide a control method and system of neutral section passing of multi-locomotive short broke trains in response to the shortcomings of the prior art, in order to solve the problem that when the multi-locomotive short broke trains operate with double-raised pantographs, if the distance between the two pantographs is shorter than the length of a neutral zone of a neutral section and longer than the length of a no-electricity zone of the neutral section, when the two pantographs pass through the neutral sections, the two pantographs will span the two neutral sections and generate an interphase short circuit, thereby improve safety of EMU when it passing neutral section and ensure that the EMU can reliably pass through the neutral section with double-raised pantographs.

In order to solve the above technical problems, the technical solution adopted by the present invention is as follows: a control method of neutral section passing of multi-locomotive short broke trains, which comprising the following steps:

1) A neutral section passing device of a primary multiple unit collects a neutral section passing instruction signal, and sends the neutral section passing instruction signal to a controller of the primary multiple unit and a controller of a secondary multiple unit, wherein the neutral section passing instruction signal comprises a neutral section passing start signal and a neutral section passing end signal;

2) triggered by the neutral section passing start signal, the controller of the primary multiple unit controls the primary multiple unit to unload a traction force and turn off a main breaker, and the controller of the secondary multiple unit controls the secondary multiple unit to unload the traction force, turn off the main breaker and lower a pantograph;

3) the controller of the primary multiple unit controls the primary multiple unit to turn on the main breaker according to the neutral section passing end signal;

4) the controller of the primary multiple unit obtains a current speed signal of the multiple unit, and starting to calculate a distance traveled by the train in real time;

5) when the distance traveled by the train is longer than the length of a neutral zone, the controller of the primary multiple unit sends a primary multiple unit neutral section passing completion command to the secondary multiple unit;

6) the controller of the secondary multiple unit controls the secondary multiple unit to raise the pantograph and turn on the main breaker according to the primary multiple unit neutral section passing completion command, so as to complete a neutral section passing operation; and 7) ending.

In the step 1), the neutral section passing device includes an ATP (train automatic protection system) control instruction neutral section passing device, a magnetic steel control instruction neutral section passing device or a manual neutral section passing device.

In the step 4), when the controller of the primary multiple unit obtains the current speed of the multiple unit from a shaft-end speed sensor, the speed signal sent by a non-power shaft speed sensor is preferentially used, and when the non-power shaft speed sensor is faulty, the speed signal sent by a power shaft speed sensor is used; when the main breaker of the primary multiple unit is closed, the controller of the primary multiple unit starts to calculate the distance traveled by the train, and the calculation period of the distance traveled by the train is 32 ms, and the distance traveled by the train equals to the current speed of the multiple unit times the running time of the train. A reliable calculation result is ensured, and the calculation process is simple.

Correspondingly, the present invention further provides a control system of neutral section passing of multi-locomotive short broke trains, comprising:

a neutral section passing device of a primary multiple unit, configured to collect a neutral section passing instruction signal, and send the neutral section passing instruction signal to a controller of the primary multiple unit and a controller of a secondary multiple unit, wherein the neutral section passing instruction signal includes a neutral section passing start signal and a neutral section passing end signal;

the controller of the primary multiple unit, configured to control the primary multiple unit to unload a traction force and turn off a main breaker according to the neutral section passing start signal; and control the secondary multiple unit to turn on the main breaker according to the neutral section passing end signal; and obtain a current speed signal of the multiple unit, start to calculate a distance traveled by the train in real time, and when the distance traveled by the train is longer than the length of a neutral zone, send a primary multiple unit neutral section passing completion command to the secondary multiple unit; and the controller of the secondary multiple unit, configured to control the secondary multiple unit to unload the traction force, turn off the main breaker and lower a pantograph according to the neutral section passing start signal; and control the secondary multiple unit to raise the pantograph and turn on the main breaker according to the primary multiple unit neutral section passing completion command.

Compared with the prior art, the present invention has the beneficial effects that: the distance traveled by the train after the primary multiple unit enters the neutral section is calculated in real time, so that the neutral section passing procedure of the secondary multiple unit is effectively controlled, thereby solving the problem that when the multi-locomotive short broke trains operate with double-raised pantographs, if the distance between the two pantographs is shorter than the length of a neutral zone of a neutral section and longer than the length of a no-electricity zone of the neutral section, when the two pantographs pass through the neutral sections, the two pantographs will span the two neutral sections and generate an interphase short circuit. The present invention improves safety of the EMU when it passing neutral section and ensure that the EMU can reliably pass through the neutral section with double-raised pantographs. The present invention has the advantages of being safe, reliable, easy to implement and convenient to promote and apply.

DETAILED DESCRIPTION OF THE EMBODIMENTS

Figure 1:
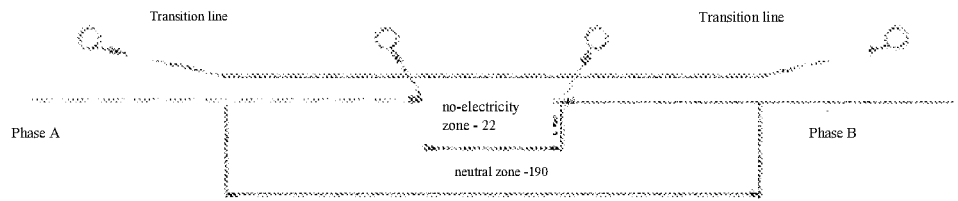
FIG. 1 is a schematic diagram of six-spanning anchoring section joint neutral section.

FIG. 1 is a schematic diagram of six-spanning anchoring section joint neutral section, including a transition line, a phase A, a phase B, a neutral zone and a no-electricity zone.

Figure 2:
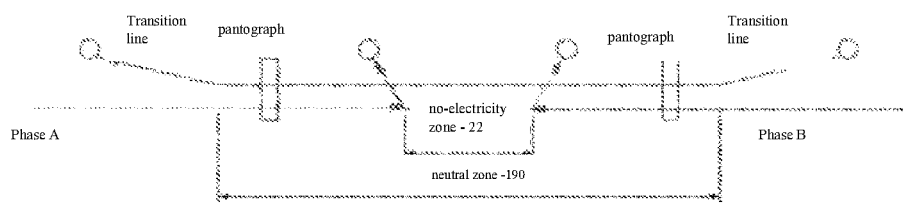
FIG. 2 is a relationship schematic diagram 1 between the distance of a pantograph and the neutral section.

FIG. 2 is a relationship schematic diagram 1 between the distance of a pantograph and the neutral section, in this figure, the distance between two pantographs is shorter than the length of the neutral zone and is longer than the length of the no-electricity zone, that is, when the two pantographs span two neutral sections, the phase A and the phase B are short-circuited. In order to avoid the occurrence of the short circuit of the phase A and the phase B, the two phase neutral sections can be safely passed by using the control method of neutral section passing in the present invention.

Figure 3:
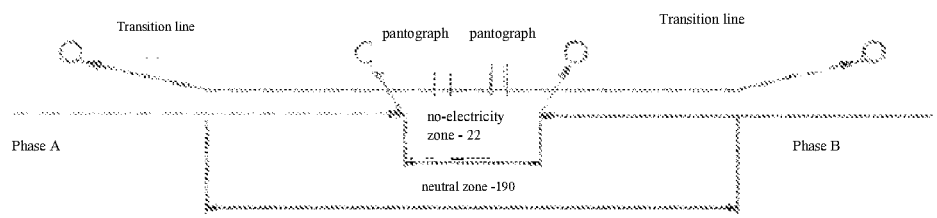
FIG. 3 is a relationship schematic diagram 2 between the distance of the pantograph and the neutral section.

FIG. 3 is a relationship schematic diagram 2 between the distance of the pantograph and the neutral section, in this figure, the distance between two pantographs is shorter than the length of the no-electricity zone, and the phase A and the phase B are not short-circuited, and thus there is no problem passing the neutral section.

Figure 4:
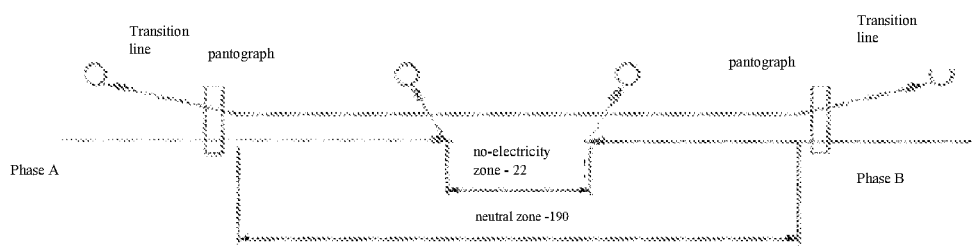
FIG. 4 is a relationship schematic diagram 3 between the distance of the pantograph and the neutral section.

FIG. 4 is a relationship schematic diagram 3 between the distance of the pantograph and the neutral section, in this figure, the distance between two pantographs is shorter than the length of the neutral zone, and the phase A and the phase B are not short-circuited, and thus there is no problem passing the neutral section.

Figure 5:
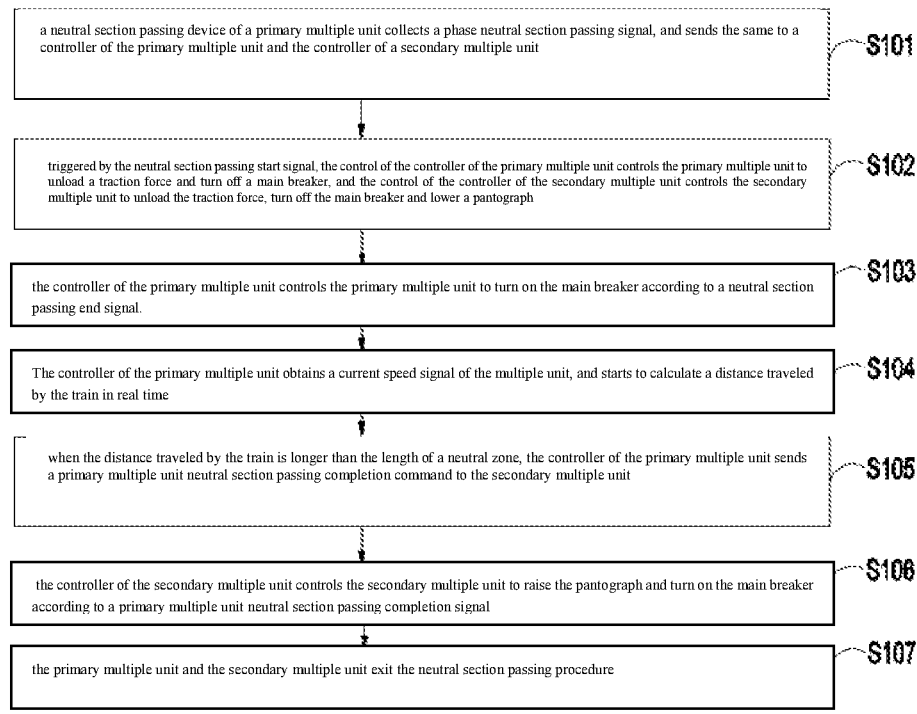
FIG. 5 is a schematic diagram of implementation flow of a control method of neutral section passing of multi-locomotive short broke trains in the present invention.

FIG. 5 shows the implementation flow of the control method of neutral section passing of multi-locomotive short broke trains provided by an embodiment of the present invention, which is detailed as follows:

Step S101: a neutral section passing device of a primary multiple unit collects a phase neutral section passing signal, and sends the same to a controller of the primary multiple unit and the controller of a secondary multiple unit.

In the embodiment of the present invention, the neutral section passing device includes an ATP control instruction neutral section passing device, a magnetic steel control instruction neutral section passing device or a manual neutral section passing device, and the like. The ATP control instruction neutral section passing device can collect an ATP neutral section passing instruction; the magnetic steel control instruction neutral section passing device collect a magnetic steel control neutral section passing instruction; and when the ATP control instruction neutral section passing device and the magnetic steel control instruction neutral section passing device are faulty, a driver can trigger the manual neutral section passing device to generate a manual neutral section passing instruction.

The neutral section passing device of the primary multiple unit collects the neutral section passing instruction signal, and sends the neutral section passing instruction signal to the controller of the primary multiple unit through a remote input and output module, and the controller of the primary multiple unit sends the neutral section passing instruction signal to the controller of the secondary multiple unit through a train bus or wireless or other manners.

Step S102: triggered by the neutral section passing start signal, the control of the controller of the primary multiple unit controls the primary multiple unit to unload a traction force and turn off a main breaker, and the control of the controller of the secondary multiple unit controls the secondary multiple unit to unload the traction force, turn off the main breaker and lower a pantograph.

In the embodiment of the present invention, when the neutral section passing device collects the neutral section passing start signal, the controller of the primary multiple unit controls the primary multiple unit to unload the traction force and turn off the main breaker, and the controller of the secondary multiple unit controls the secondary multiple unit to unload the traction force, turn off the main breaker and lower the pantograph.

Step S103: the controller of the primary multiple unit controls the primary multiple unit to turn on the main breaker according to a neutral section passing end signal.

In the embodiment of the present invention, when the neutral section passing device collects the neutral section passing end signal, the controller of the primary multiple unit detects a transition process of the network voltage of the primary multiple unit developing from nothing, and the controller of the primary multiple unit sends a main breaker turn-on command to stably restore the currently set traction force. If the network voltage jump is not detected correctly or the neutral section passing end signal is lost, the driver can complete a main breaker turn-on operation by operating a main breaker control switch.

Step S104: the controller of the primary multiple unit obtains a current speed signal of the multiple unit, and starts to calculate a distance traveled by the train in real time.

In the embodiment of the present invention, the controller of the primary multiple unit obtains the current speed of the multiple unit from a shaft-end speed sensor, the speed signal sent by a non-power shaft speed sensor is preferentially used, and when the non-power shaft speed sensor is faulty, the speed signal sent by a power shaft speed sensor is used. When the main breaker of the primary multiple unit is closed, the controller of the primary multiple unit starts to calculate the distance traveled by the train, the calculation period of the distance traveled by the train is 32 ms, and the calculation formula is: the distance traveled by the train equals to the current speed of the multiple unit times the running time of the train.

Step S105: when the distance traveled by the train is longer than the length of a neutral zone, the controller of the primary multiple unit sends a primary multiple unit neutral section passing completion command to the secondary multiple unit.

In the embodiment of the present invention, when the distance traveled by the train is longer than the length of the neutral zone, the controller of the primary multiple unit sends the primary multiple unit neutral section passing completion command to the secondary multiple unit through the train bus or wired manner.

Step S106: the controller of the secondary multiple unit controls the secondary multiple unit to raise the pantograph and turn on the main breaker according to a primary multiple unit neutral section passing completion signal.

In the embodiment of the present invention, when the controller of the secondary multiple unit receives a neutral section passing completion instruction, the controller of the secondary multiple unit controls the secondary multiple unit to raise the pantograph, after the controller of the secondary multiple unit detects that the network voltage of the secondary multiple unit is normal, the controller of the secondary multiple unit sends a secondary multiple unit main breaker turn-on command to stably restore the currently set traction force, so as to complete the neutral section passing operation.

Step S107: the primary multiple unit and the secondary multiple unit exit the neutral section passing procedure.

In the present invention, the short broke trains includes a single-form electric multiple unit, a two-form electric multiple unit, a three-form electric multiple unit, a four-form electric multiple unit, a five-form electric multiple unit, a six-form electric multiple unit and the like; and the multi-locomotive includes double-locomotive multiple units, triple-locomotive multiple units, quadruple-locomotive multiple units, and the like. The double-pantograph raising operation includes double-pantograph raising operation of a single multiple unit and double-pantograph raising operation of a multi-locomotive multiple unit.

The invention claimed is:

1. A control method of neutral section passing of multi-locomotive short broke trains, the method comprising:
    collecting, with a neutral section passing device of a primary multiple unit, a neutral section passing instruction signal, and sending the neutral section passing instruction signal to a controller of the primary multiple unit and a controller of a secondary multiple unit, wherein the neutral section passing instruction signal comprises a neutral section passing start signal and a neutral section passing end signal;
    in response to the neutral section passing start signal, controlling, with the controller of the primary multiple unit, the primary multiple unit to unload a traction force and turn off a main breaker, and controlling, with the controller of the secondary multiple unit, the secondary multiple unit to unload the traction force, turn off the main breaker and lower a pantograph;
    controlling, with the controller of the primary multiple unit, the primary multiple unit to turn on the main breaker according to the neutral section passing end signal;
    obtaining, with the controller of the primary multiple unit, a current speed signal of the multiple unit, and starting to calculate a distance traveled by the train in real time; when the distance traveled by the train is longer than the length of a neutral zone, sending, with the controller of the primary multiple unit, a primary multiple unit neutral section passing completion command to the secondary multiple unit; and
    controlling, with the controller of the secondary multiple unit, the secondary multiple unit to raise the pantograph and turn on the main breaker according to the primary multiple unit neutral section passing completion command to complete a neutral section passing operation.

2. The method of claim 1, wherein, in the collecting a neutral section passing instruction signal, and sending the neutral section passing instruction signal to a controller of the primary multiple unit and a controller of a secondary multiple unit, the neutral section passing device comprises at least one of an automatic train protection (ATP) control instruction neutral section passing device, a magnetic steel control instruction neutral section passing device or a manual neutral section passing device.

3. The method of claim 1, wherein, in the controlling the primary multiple unit to turn on the main breaker according to the neutral section passing end signal, the neutral section passing end signal causes the controller of the primary multiple unit to perform:
    detecting a transition process of the network voltage of the primary multiple unit developing from nothing, and sending a main breaker turn-on command to stably restore the currently set traction force; and
    if the network voltage jump is not detected correctly or the neutral section passing end signal is lost, operating a main breaker control switch to complete a main breaker turn-on operation.

4. The method of claim 1, wherein, in the obtaining and starting to calculate a distance traveled by the train in real time, when the controller of the primary multiple unit obtains the current speed of the multiple unit from a shaft-end speed sensor, the speed signal sent by a non-power shaft speed sensor is used, and when the non-power shaft speed sensor is faulty, the speed signal sent by a power shaft speed sensor is used; and when the main breaker of the primary multiple unit is closed, the controller of the primary multiple unit starts to calculate the distance traveled by the train.

5. The method of claim 4, wherein the calculation period of the distance traveled by the train is 32 ms.

6. The method of claim 1, wherein the distance traveled by the train equals to the current speed of the multiple unit times the running time of the train.

7. The control method of neutral section passing of multi-locomotive short broke trains according to claim 1, wherein, in the controlling the secondary multiple unit to raise the pantograph and turn on the main breaker according to the primary multiple unit neutral section passing completion command to complete a neutral section passing operation, the controller of the secondary multiple unit performs:
   controlling the secondary multiple unit to raise the pantograph, and
   after the controller of the secondary multiple unit detects that the network voltage of the secondary multiple unit is normal, sending a secondary multiple unit main breaker turn-on command to stably restore the currently set traction force to complete the neutral section passing operation.

8. A control system of neutral section passing of multi-locomotive short broke trains, the system comprising:
   a primary multiple unit and a secondary multiple unit,
   wherein a neutral section passing device of the primary multiple unit, configured to collect a neutral section passing instruction signal, and send the neutral section passing instruction signal to a controller of the primary multiple unit and a controller of a secondary multiple unit, the neutral section passing instruction signal including a neutral section passing start signal and a neutral section passing end signal;
   the controller of the primary multiple unit, configured to control the primary multiple unit to unload a traction force and turn off a main breaker according to the neutral section passing start signal; and control the secondary multiple unit to turn on the main breaker according to the neutral section passing end signal; and obtain a current speed signal of the multiple unit, start to calculate a distance traveled by the train in real time, and when the distance traveled by the train is longer than the length of a neutral zone, send a primary multiple unit neutral section passing completion command to the secondary multiple unit; and
   the controller of the secondary multiple unit, configured to control the secondary multiple unit to unload the traction force, turn off the main breaker and lower a pantograph according to the neutral section passing start signal; and control the secondary multiple unit to raise the pantograph and turn on the main breaker according to the primary multiple unit neutral section passing completion command.

9. The system of claim 8, wherein the neutral section passing device comprises an ATP control instruction neutral section passing device, a magnetic steel control instruction neutral section passing device or a manual neutral section passing device.

* * * * *